F. O. BOSWELL.
AUTOMOBILE STEERING GEAR LOCK.
APPLICATION FILED FEB. 17, 1919.
1,345,828.   Patented July 6, 1920.
2 SHEETS—SHEET 1.
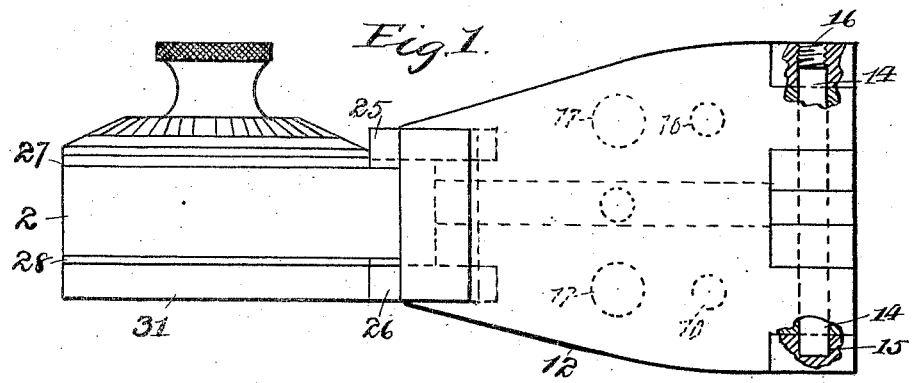
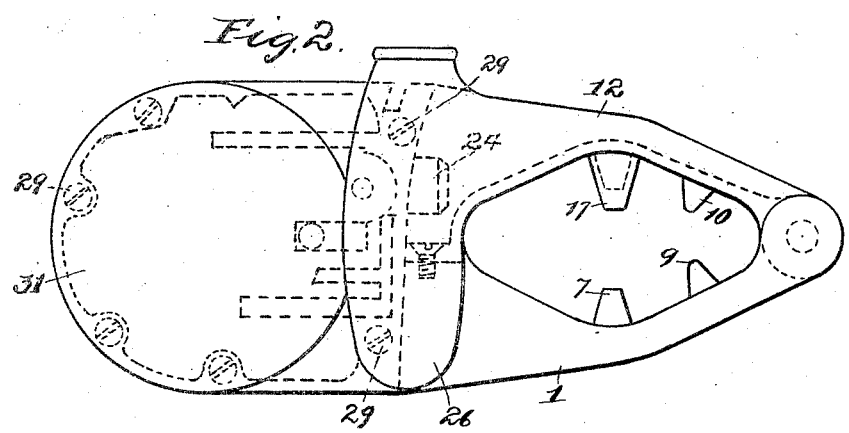
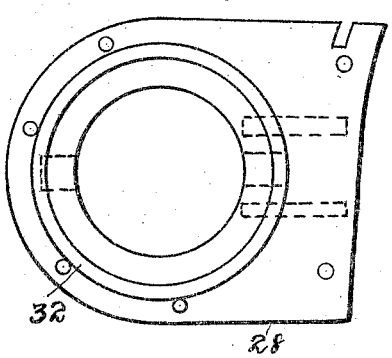 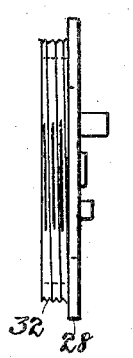
Inventor
Fletcher O. Boswell
W. W. Williamson

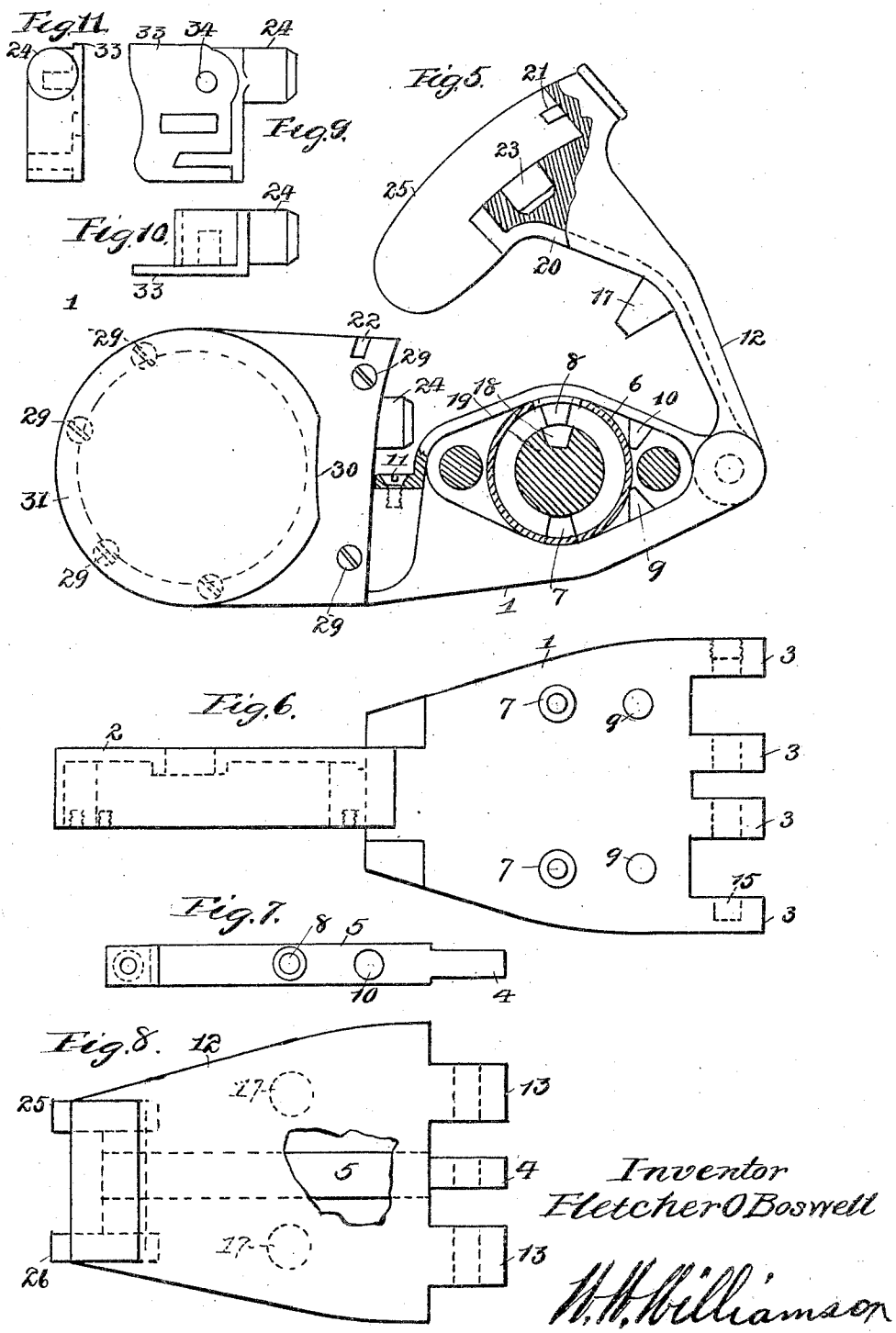

UNITED STATES PATENT OFFICE.

FLETCHER O. BOSWELL, OF PHILADELPHIA, PENNSYLVANIA.

AUTOMOBILE-STEERING-GEAR LOCK.

1,345,828.  Specification of Letters Patent.  Patented July 6, 1920.

Application filed February 17, 1919. Serial No. 277,629.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Steering-Gear Locks, of which the following is a specification.

My invention relates to a new and useful improvement in automobile steering gear locks, and has for its object to provide an exceedingly simple and effective device of this description by which the steering mechanism of an automobile may be locked in position which holds the front wheels at an angle, thereby preventing the machine from being driven or towed by an unauthorized person.

A further object of my invention is to so construct such a lock that it does not have to be removed from the steering post casing when unlocked being provided with means for holding it in place while the locking member may be released and swung open.

A still further object of my invention is to so construct the device that the locking member when in position to lock the steering gear will also lock various removable parts of the device so that they may not be removed until the locking member is released and swung open.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a side elevation of a lock made in accordance with my invention.

Fig. 2, is a bottom plan view thereof.

Fig. 3, is a bottom plan of the base plate of the combination lock.

Fig. 4, is an edge view of Fig. 3.

Fig. 5, is a view similar to Fig. 2 showing my device secured upon the steering post casing of an automobile, said casing and post being in cross section and a portion of the locking member broken away and sectioned to better show its construction.

Fig. 6, is an elevation of the main clamping member and combination lock casing looking in the direction of the arrow 1, relative to Fig. 5.

Fig. 7, is a side elevation of the secondary clamping member.

Fig. 8, is a side elevation of the locking member.

Fig. 9, is a plan view of the bolt of the combination lock.

Fig. 10, is a side elevation of Fig. 9, and,

Fig. 11, is an end view of Fig. 9.

In carrying out my invention as here embodied 1 represents the main clamping member which carries the combination lock casing 2 and terminates in the hinge tangs 3 to certain of which the hinge tangs 4 of the secondary clamping member 5 are hinged as hereinafter set forth. This secondary clamping member is adapted to extend around the opposite side of the steering post casing 6 from the main clamping member the latter being provided with two lugs 7 for passing through a hole formed through said casing, the secondary clamping member is also provided with a lug 8 which projects through a corresponding hole in the casing upon the opposite side thereof. The main clamping member may also be provided with lugs 9 and the secondary clamping member with the corresponding lug 10, these last named lugs being extended to bear against the exterior of the casing as clearly shown in Fig. 5.

By this arrangement the device is secured upon the steering post casing by the secondary clamping member being swung into place and secured by the screw 11. This holds the device in place whether locked or unlocked and facilitates the operation thereof.

12 represents the locking member having the hinge tangs 13 which co-act with the hinge tangs 3 to hinge the main clamping member and the locking member together, the pintle 14 passing through these tangs, and the tang 4 of the secondary clamping member for that purpose.

In order that the hinge members may not be easily disconnected when the device is in use, the pintle 14 passes into a blind hole 15 in one of the tangs 3 so that access cannot be had to this end thereof, and the opposite end thereof is protected by a headless screw 16 which is screwed down upon the pintle and may be sweated or brazed in place.

The locking member is provided with two relatively large lugs 17 which when this member is in its locked position pass into the holes 18 formed in the steering gear post 19 and these holes are intended to be formed in the post at such points thereon that when they register with the lugs 17 the steering mechanism would be holding the front wheels of the automobile at an angle.

The locking member has a groove 20 formed in the inner face thereof of the general shape of the secondary clamping member 5 so that when this locking member is closed as shown in Fig. 2 the secondary clamping member lies within said slot. The locking member is provided with the tongue 21 which passes into the notch 22 formed in the combination lock casing 2, and is also provided with a keeper recess 23 into which the bolt 24 of the combination lock is shot when the mechanism of the combination lock is properly operated, and when this takes place the locking member is securely held against being swung open and not only holds the steering mechanism against manipulation by an unauthorized person, but holds all of the removable parts of the device against removal as hereinafter set forth.

The locking member is provided with two wings 25 and 26 which pass over a portion of the top plate 27 and the bottom plate 28 and certain of the screws 29 thus preventing the removal of these plates when the device is locked; one of these wings also engages or registers with the cut out portion 30 of the cap 31, preventing this cap from being unthreaded from the collar 32 upon which said cap is screwed. The locking bolt 24 is formed with the sliding plate 33 having the post 34 for connection through an actuating dog with the combination mechanism of the lock, which mechanism is not here shown as it forms no part of my present invention.

From the foregoing description it will be seen that an exceedingly simple and effective device is provided which may be securely fastened to the steering post casing of an automobile for ready manipulation, and when locked holds the steering gear in the desired position and prevents the removal of the parts of the device.

Of course I do not wish to be limited to the exact details of construction as herein shown, as these may be varied within the limits of the appended claims without departing from the spirit of my invention.

Having thus fully described my invention, what I claim as new and useful, is:—

1. In a device of the character described, the combination of a lock casing having formed therewith the main clamping member, a secondary clamping member hinged to the main clamping member, the two clamping members adapted to embrace the casing of an automobile steering post, a locking member also hinged to the main clamping member and adapted to close over the secondary clamping member, lugs projecting from the members for engagement with the steering post casing; and means for locking the locking member in its closed position.

2. A steering gear lock for automobiles comprising a combination lock, a main clamping member formed with the casing of said lock, lugs projecting from the inner face of said clamping member for engagement with the casing of the steering post, a secondary clamping member pivoted to the first named member, means for securing said secondary member in its closed position, lugs projecting from the secondary member for engagement with said casing, a locking member also hinged to the main clamping member, a lug projecting from said locking member adapted to pass into a hole formed in a steering post, said locking member having a groove therein for housing the secondary clamping member, wings formed with the locking member for holding the removable parts of the device against removal, and means for locking the locking member in its closed position.

3. In an automobile steering gear lock a combination lock casing, a main clamping member formed therewith, hinge tangs formed with the clamping member, a secondary clamping member hinged between certain of the tangs of the main clamping member, means for securing the secondary clamping member in its closed position, lugs projecting from both the main and secondary clamping members for engagement with the casing of a steering post, a locking member having a groove therein for housing the secondary clamping member, hinge tangs formed with the locking member adapted to be hinged to the tangs of the main clamping member, a lug projecting from the inner face of the locking member adapted to engage a hole formed in the steering post so as to prevent the rotation of said post, a tongue formed with the locking member for engagement with a suitable slot in the lock casing, a locking bolt adapted to enter into engagement with the keeper recess formed in the locking member, wings formed with the locking member for engaging the removable parts of the lock to prevent the latter from being removed when the locking member is in its closed position.

In testimony whereof I have hereunto affixed my signature.

FLETCHER O. BOSWELL.